United States Patent
Lockwood et al.

(10) Patent No.: US 6,694,234 B2
(45) Date of Patent: Feb. 17, 2004

(54) CUSTOMER SERVICE AUTOMATION SYSTEMS AND METHODS

(75) Inventors: Robert Farrell Lockwood, Winston-Salem, NC (US); David Scott Kerven, Atlanta, GA (US); Gregory Max Oman, Wildwood, MO (US); Verne Ewald Purvines, Chesterfield, MO (US); David Robert Small, Advance, NC (US); Laurie Oldham Smith, Kernersville, NC (US); Mitchell Franklin White, Atlanta, GA (US); Jason Leonard Wrather, Wentzville, MO (US)

(73) Assignee: GMAC Insurance Company, St. Louis, MO (US)

( * ) Notice: Subject to any disclaimer, the term of this patent is extended or adjusted under 35 U.S.C. 154(b) by 0 days.

(21) Appl. No.: 09/971,629

(22) Filed: Oct. 9, 2001

(65) Prior Publication Data

US 2002/0177926 A1 Nov. 28, 2002

Related U.S. Application Data

(60) Provisional application No. 60/238,764, filed on Oct. 6, 2000.

(51) Int. Cl.$^7$ ................................................ G06F 7/00
(52) U.S. Cl. .......................................... 701/29; 701/33
(58) Field of Search .............................. 701/29, 31, 32, 701/33, 36, 200, 1, 213; 342/454, 455, 456; 318/587; 455/456, 412

(56) References Cited

U.S. PATENT DOCUMENTS 4,494,119 A 1/1985 Wimbush ................... 343/457
5,223,844 A 6/1993 Mansell et al. ............. 342/357
5,389,935 A 2/1995 Drouault et al. ............ 342/457

(List continued on next page.)

FOREIGN PATENT DOCUMENTS

WO 90/02388 3/1990

OTHER PUBLICATIONS

Saffo, Paul. "Sensors: The Next Wave of Innovation." *ACM Digital Library*. vol. 40, Issue 2, pp. 92–97, 1997.

H. Kauderer et al. "Optimization of Collection Efforts in Automobile Financing—A KDD supported Environment." *ACM Digital Library*. San Diego, CA, pp. 414–416, 1999.

E. Hotz et al. "WAPS, a Data Mining Support Environment for the Planning of Warranty and Goodwill Costs in the Automobile Industry." *ACM Digital Library*. San Diego, CA, pp. 417–419, 1999.

Gamaa, Hassan. "Structuring Criteria for Real Time System Design." *ACM Digital Library*. Pittsburgh, PA, pp. 290–301, 1989.

Rogers, Seth et al. "Mining GPS Data to Augment Road Models." *ACM Digital Library*. San Diego, CA, pp. 104–113, 1999.

*Primary Examiner*—Richard M. Camby
(74) *Attorney, Agent, or Firm*—McKenna Long & Aldridge LLP (57) ABSTRACT

The present invention provides systems and methods for automation and enhancement of customer service in vehicle distress situations. A typical process according to the present invention involves the detection of a vehicle distress event. Once a distress event is detected, a response plan is generated based upon at least the detected event. The response plan is then acted upon in an automated fashion to provide an enhanced service experience for the customer.

10 Claims, 6 Drawing Sheets

U.S. PATENT DOCUMENTS

| | | | |
|---|---|---|---|
| 5,515,285 A | 5/1996 | Garrett, Sr. et al. | 364/460 |
| 5,680,119 A | 10/1997 | Magliari et al. | 340/904 |
| 5,757,645 A * | 5/1998 | Schneider et al. | 701/29 |
| 5,797,134 A | 8/1998 | McMillan et al. | 705/400 |
| 5,815,093 A | 9/1998 | Kikinis | 340/937 |
| RE35,920 E | 10/1998 | Sorden et al. | 342/457 |
| 5,910,766 A | 6/1999 | Evans | 340/539 |
| 6,064,970 A | 5/2000 | McMillan et al. | 705/4 |
| 6,073,004 A | 6/2000 | Balachandran | 455/404 |
| 6,076,026 A | 6/2000 | Jambhekar et al. | 701/35 |
| 6,112,152 A | 8/2000 | Tuttle | 701/115 |
| 6,141,610 A | 10/2000 | Rothert et al. | 701/35 |
| 6,411,891 B1 * | 6/2002 | Jones | 701/20 |
| 6,415,207 B1 * | 7/2002 | Jones | 701/1 |
| 6,430,486 B1 * | 8/2002 | Diaz et al. | 701/33 |

* cited by examiner

CUSTOMER SERVICE AUTOMATION SYSTEMS AND METHODS

CROSS REFERENCES TO RELATED APPLICATIONS

This application claims benefit of U.S. Provisional Patent Application No. 60/238,764, filed on Oct. 6, 2000, the entirety of which is hereby incorporated by reference for all purposes as if fully set forth herein.

BACKGROUND OF INVENTION

1. Field of the Invention

The present invention relates to systems and methods for automation and enhancement of customer service in vehicle distress situations. More particularly, the invention relates to systems and methods for monitoring motor vehicle operational characteristics to obtain increased amounts of data relating to the state of the vehicle for purposes of providing a more comprehensive and immediate customer service response in cases such as thefts, accidents, breakdown, potential breakdown, mechanical failure or potential mechanical failure or emergency.

2. Description of Related Art

Conventional methods for determining the type and level of customer service required by a consumer were dependent upon on personal interaction with the customer and their ability to locate and purchase the needed services after a loss. The principal problem with such conventional methods is the time required identifying the need, servicing the need and the extent to which the customer can effectively purchase the needed services in a timely manner.

In instances of distress involving vehicles such as thefts, accidents, breakdown, potential breakdown, mechanical or other potential distress situations (collectively, "distress events"), typical customer services responses may only be initiated by the customer after the distress event. Some prior art systems suggest utilization of onboard sensor systems to detect an emergency situation and to notify appropriate medical and law enforcement authorities automatically. Such systems improve the response time in an emergency but do little to help the customer recover from such situations.

In one embodiment, the present invention contemplates a new and improved motor vehicle monitoring, recording and communication system, which may support improved and enhanced customer service in response to a distress situation. Such a system is adaptable to current electronic operating systems, tracking systems and communication systems for the improved extraction of selected situational related data. In other embodiments, either the customer or a third party may initiate the enhanced customer services contemplated where such vehicle monitoring equipment is unavailable or malfunctioning.

SUMMARY OF THE INVENTION

The present invention is directed to systems and methods for automation and enhancement of customer service in vehicle distress situations. A typical process according to the present invention involves the detection of a vehicle distress event. Event detection may be accomplished in a variety of ways including detection based upon feedback from onboard sensors, customer initiated reporting or third party reporting. Once a distress event is detected, a response plan is generated based upon the detected event. In some embodiments, the response plan may also be impacted by other criteria such as insurance coverage connected with the vehicle, warranty information associated with the vehicle or a customer profile connected with either the usual driver of the vehicle and/or the vehicle itself. The response plan is then acted upon in an automated fashion. Elements of a response plan may include dispatching appropriate emergency assistance, arranging and delivering a rental vehicle, scheduling a repair appointment, checking parts availability and preordering out-of-stock parts at the location where the repair appointment was scheduled, notifying the customer of suggested maintenance or immediate potential problems, dispatching of or scheduling of an appoint with a claims adjustor, notifying parties designated by the customer.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF THE INVENTION

A preferred embodiment of the invention is now described in detail. Referring to the drawings, like numbers indicate like parts throughout the views. As used in the description herein, the meaning of "a," "an," and "the" includes plural reference unless the context clearly dictates otherwise. Also, as used in the description herein, the meaning of "in" includes "in" and "on" unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Figure 1:
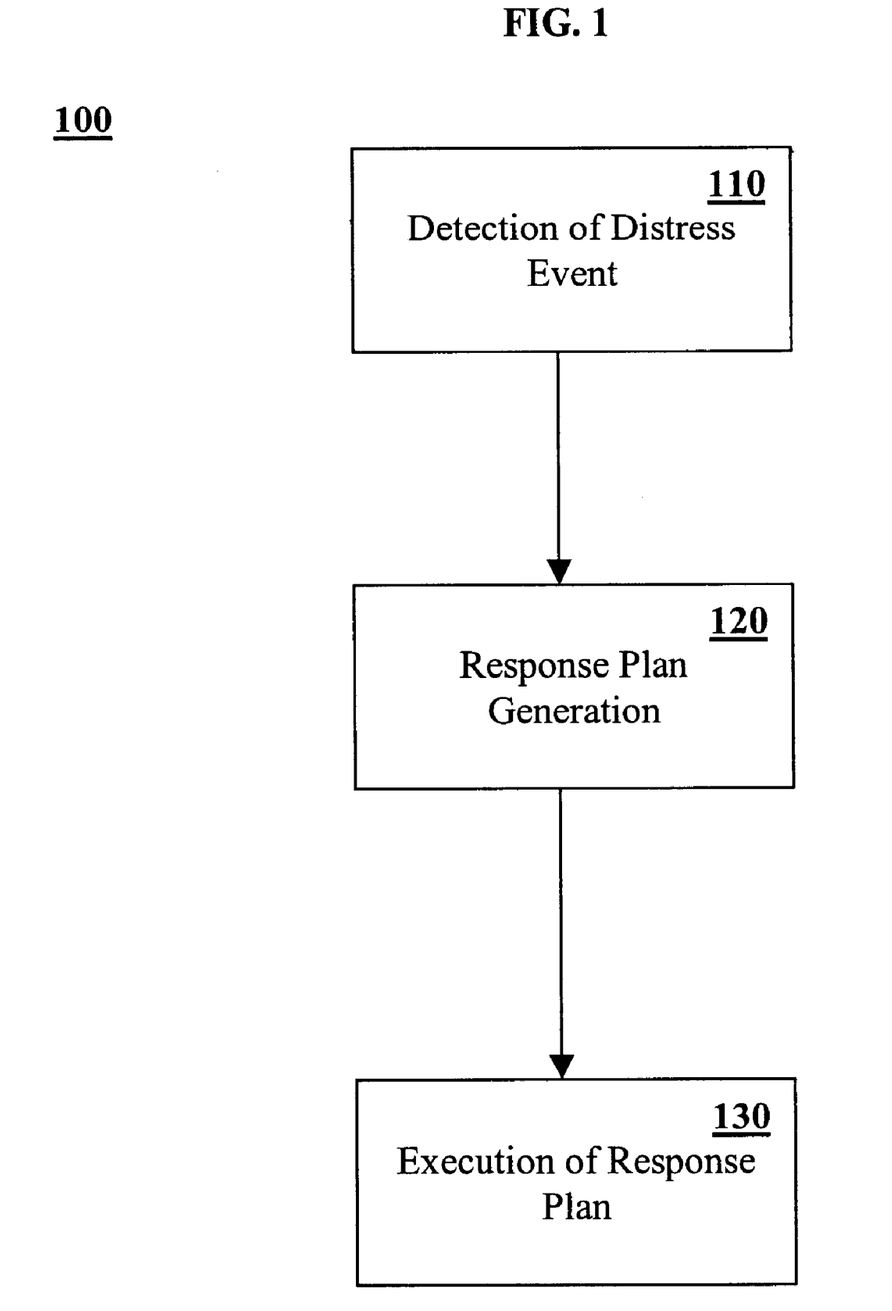
FIG. 1 is a diagram of a typical process according to the present invention.

FIG. 1 depicts a typical process 100 according to the present invention. A distress event is detected with respect to a vehicle 110. Upon detection, a response plan is generated 120. The generated response plan is then executed in an at least a semi-automated fashion 130. In some embodiments, steps 120 and 130 may be iterative in nature. In such embodiments, partial plan generation occurs at step 120 followed by execution at 130; the partial execution may impact further plan generation at step 120 again with subsequent execution at 130. Iterative generation and execution may continue until the complete customer service plan has been generated and executed.

The detection step may occur in several ways. Ultimately, a notification trigger associated with the distress event is detected. The notification trigger may result from a direct communication from the customer, a communication or report from a third-party or a communication initiated by the vehicle itself. In some embodiment, the distress event may be detected by multiple of these aforementioned means. In such situations, a more detailed indication of the distress event may be possible.

First, the detection may occur as a result of a customer-initiated communication indicating the occurrence of the distress event. The customer may communicate through any appropriate communications channel. In one preferred embodiment, the communication may be through a vehicle mounted communication device such as a mobile telephone, a CB radio or other wireless transmission device. In other embodiments, the customer may initiate communication via a wireless communication device that is not mounted to the vehicle such as a standard mobile telephone or via a standard telephone connection. The communication may be received by either a human operator at a control center, an automated voice response (AVR) system or some combined system. The communication may be in the form of either an audio transmission or a data transmission. Audio will contain voice communication by the customer. In one embodiment, a data transmission may result from a touch-tone interaction with an AVR system. In other embodiments, a data transmission may result from the triggering of a device by the customer such as a panic button that generates and transmits a predefined data message.

In another embodiment, the event detection may result from an action of a third-party. For instance, a law enforcement or emergency service provider may report a vehicle related incident. In one embodiment, such reports are monitored according to the present invention to detect distress events. Reports and/or information in such reports may be entered into databases which may be accessed in a variety of ways including, but not limited to, direct connection, dial-up connection, network connection, etc. In other embodiments, the reporting agency may proactively forward reports leading to the detection of the distress event.

In yet another approach to distress event detection is through direct access to sensors residing in the distressed vehicle. The following table summarizes some potential sensors as well as their potential utilization within the scope of the present invention.

| # | Type Sensor | Purpose |
| --- | --- | --- |
| 1 | Seat belt | Report sudden "G" force indicating collision impact may have occurred |
| 2 | "G" Force | Report sudden "G" force indicating collision impact may have occurred (Any direction) |
| 3 | Altimeter | Report if the degree of vehicle body roll indicates a roll-over accident may have occurred |

-continued

| # | Type Sensor | Purpose |
| --- | --- | --- |
| 4 | Water | Report when water level in vehicle indicates the vehicle may have suffered flood damage |
| 5 | Electrical | Report when electrical short indicates vehicle may be at risk for fire damage |
| 6 | Air bag | Report air bag deployment that indicates front end collision has occurred - Removal by theft |
| 7 | Bumper | Report abnormal impacts that indicate a collision may have occurred |
| 8 | Panels | Report and identify panels heavily impacted or damaged indicating a collision may have occurred |
| 9 | Parts | Report when parts removed from vehicle indicating possible theft may be in progress |
| 10 | Impact | Report severity of impact |
| 11 | Anti-theft | Report when anti-theft system indicates the vehicle may be at risk |
| 12 | Glass | Report when glass broken or removed from vehicle indicating vehicle may be at risk |
| 13 | Key | Report if vehicle started without using the computer chip key issued by the manufacturer |
| 14 | Ignition switch | Report if ignition system has been compromised |
| 15 | Locks | Report if any locks on the vechile are compromised (Doors, truck, compartments, etc.) |
| 16 | Driver | Report when vehicle being driven by other than identified driver (Voice, eye, fingerprint, etc.) |
| 17 | Locator (GPS) | Locate stolen vehicles |
| 18 | Functionality | Report when vehicles mechanical parts or systems fail to perform as intended |
| 19 | Safety | Report when occupants not wearing safety belt |
| 20 | Tires | Report sudden loss of air pressure or vibration in one or more tires |
| 21 | Communication link | Report if communication channel from vehicle is compromised |
| 22 | Speed | Report when vehicle being driven in excess of the posted speed limit or limit established by the customer (Parental control) |
| 23 | Voice | Report emergencies by voice command (Key word for use in hostage situation) |
| 24 | Maintenance | Report when scheduled maintenance is overdue |
| 25 | Barometric Pressure | Report sudden increases indicating an explosion may have occurred |
| 26 | Safety | Report when any safety related part on the vehicle fails to perform as intended |
| 27 | Environmental | Report exposure to any hazard that may be harmful to either the vehicle or its occupants |
| 28 | Temperature | Report excessive internal temperature within occupied vehicles (Child left in unattended vehicle) |
| 29 | Fuel | Report when vehicle runs out of fuel |
| 30 | Distance traveled | Record mileage |
| 31 | Anti-theft disabled | Record when anti-theft device is disabled while the vehicle is not operational |
| 32 | Rapid acceleration or deceleration | Record when these events occur and their severity |
| 33 | ABS engaged | Record when the ABS system is deployed |

Figure 2:
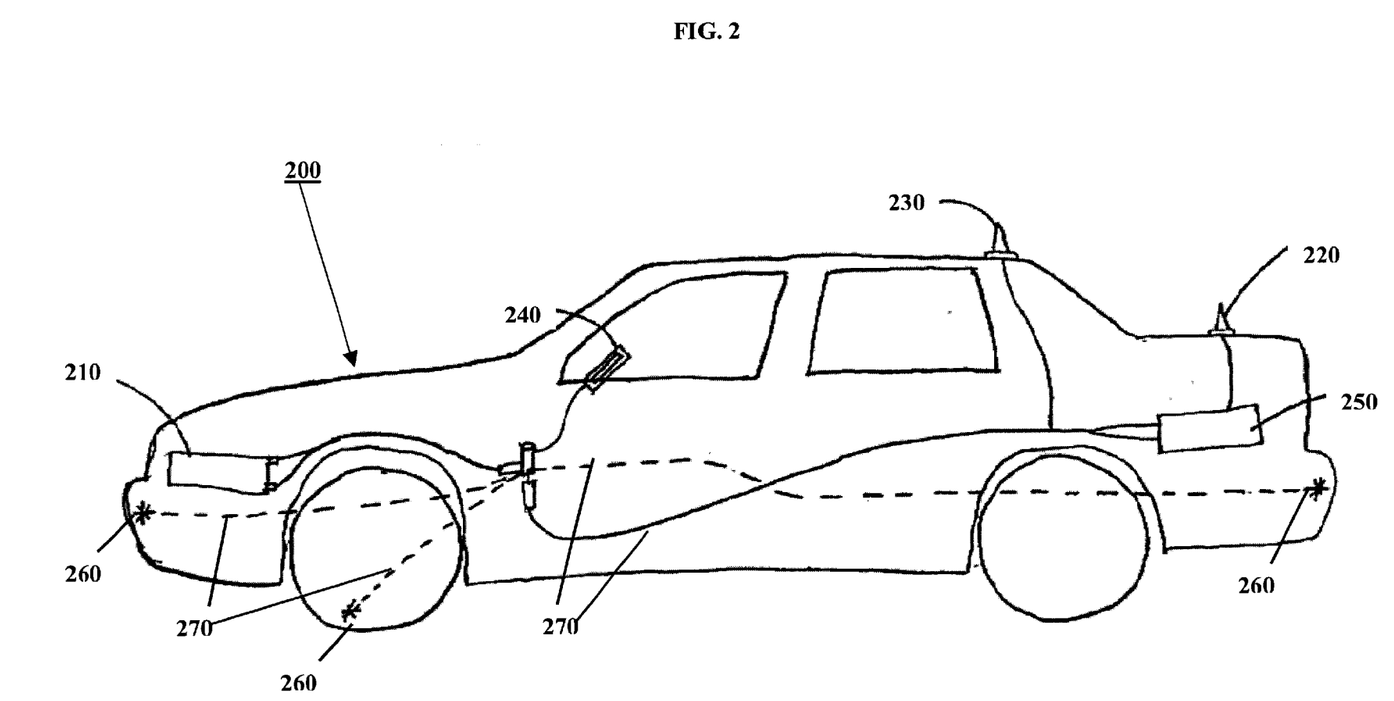
FIG. 2 is a suggestive drawing of a vehicle including certain data element monitoring/recording devices, control devices and communications devices

With reference to FIG. 2, and example motor vehicle is shown in which the sensor devices that may be used for implementing the subject invention are include. An on board computer 250 monitors and records various sensors 260 and operator actions to acquire the desired data for determining what type of event has occurred and the data to determine the severity of the event for determining the appropriate customer service response. Although not shown any number of operating sensors may be associated with the motor vehicle to monitor a wide variety of raw data elements. Such data elements are communicated to the computer through a suitable communications link 270 such as a connection cable and/or connectors and/or wireless transceiver and/or other sensors. An operator-activated device 240 may also be connected to the computer through cable and/or connectors and/or other sensors. The computer is powered through the vehicle battery 210 or other power source such as a conventional generator system (not displayed), rechargeable battery, etc. Tracking of the vehicle for location identification can be implemented by the computer 250 through navigation signals obtained from a global positioning system (GPS) antenna 220 or other locating system. The communications link to a central control station is accomplished through the cellular telephone, radio, satellite or other wireless communication system 230.

Figure 3:
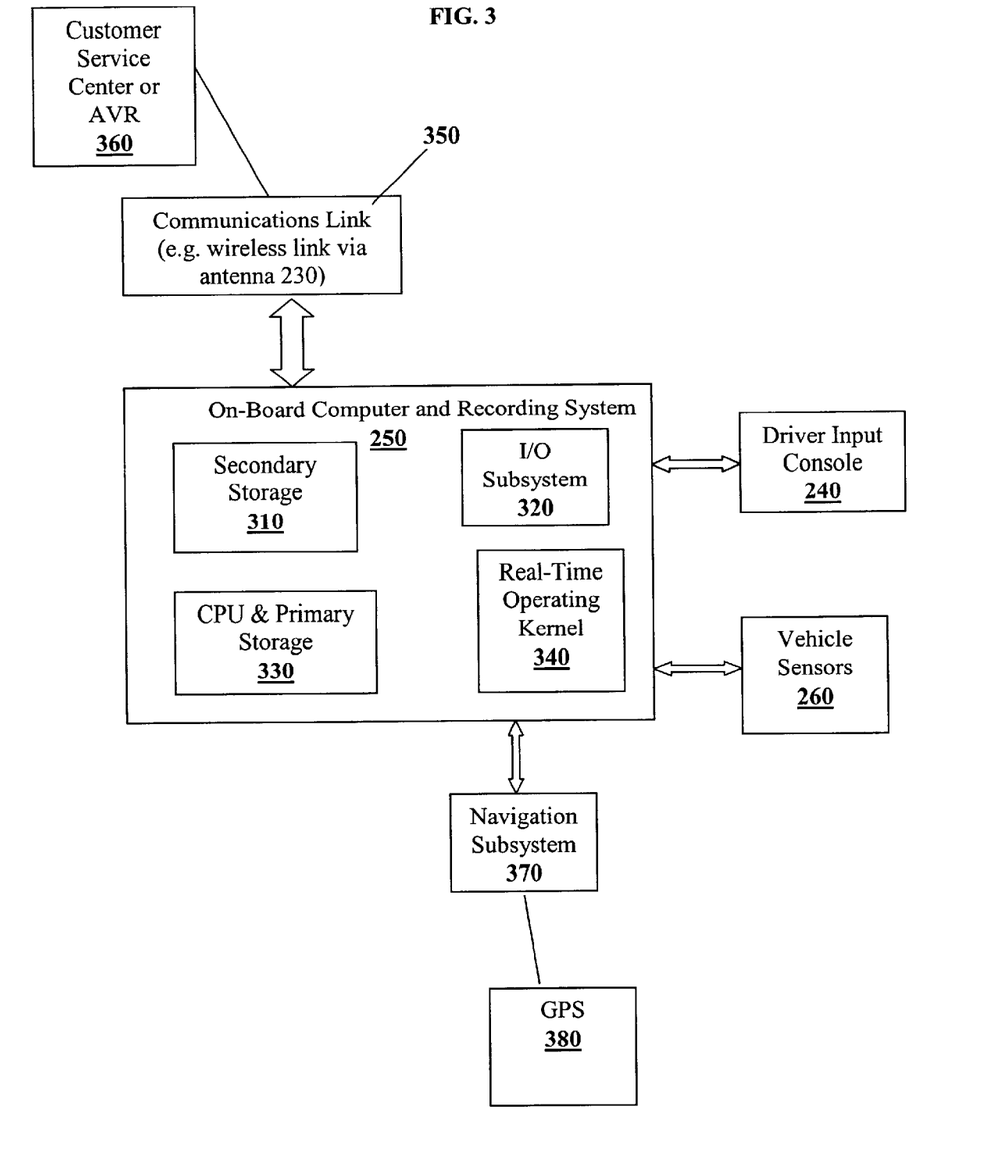
FIG. 3 is a block diagram of an on-board computer that could serve as the control device in FIG. 2.

FIG. 3 provides the block diagram of the in-vehicle computer system 250. The computer 250 in a typical embodiment may include 4 principle components, secondary storage 310, an input/output subsystem 320 for communicating to a variety of external devices, a central processing unit and primary storage 330 and a real time operating kernel 340 for controlling the various processing steps of the computer 250. The computer 250 communicates with the various on-board devices that may include an operator-activated device 240 enabling the driver to initiate contact, a navigation subsystem 370 connected to GPS system 380 utilizing antenna 220 and the various sensors 260 monitoring the physical condition/status/operation of the vehicle. The vehicle is linked to an operational control center or AVR 360 by a communications link 350.

In one particular embodiment, third party reporting or sensor based reporting may be utilized as the trigger for a parental control distress event. A police report of a driving under the influence or excessive speed violation in connection with the vehicle while being driven by a particular driver could trigger an automated customer service response. Similarly, sensor detections of driving in a reckless manner including excessive speed as judged by actual speed and designated speed limits based upon vehicle location and GIS data or weaving as judged by lateral force sensors in the vehicle while the vehicle is being driven by a particular driver could similarly trigger a response.

Figure 5:
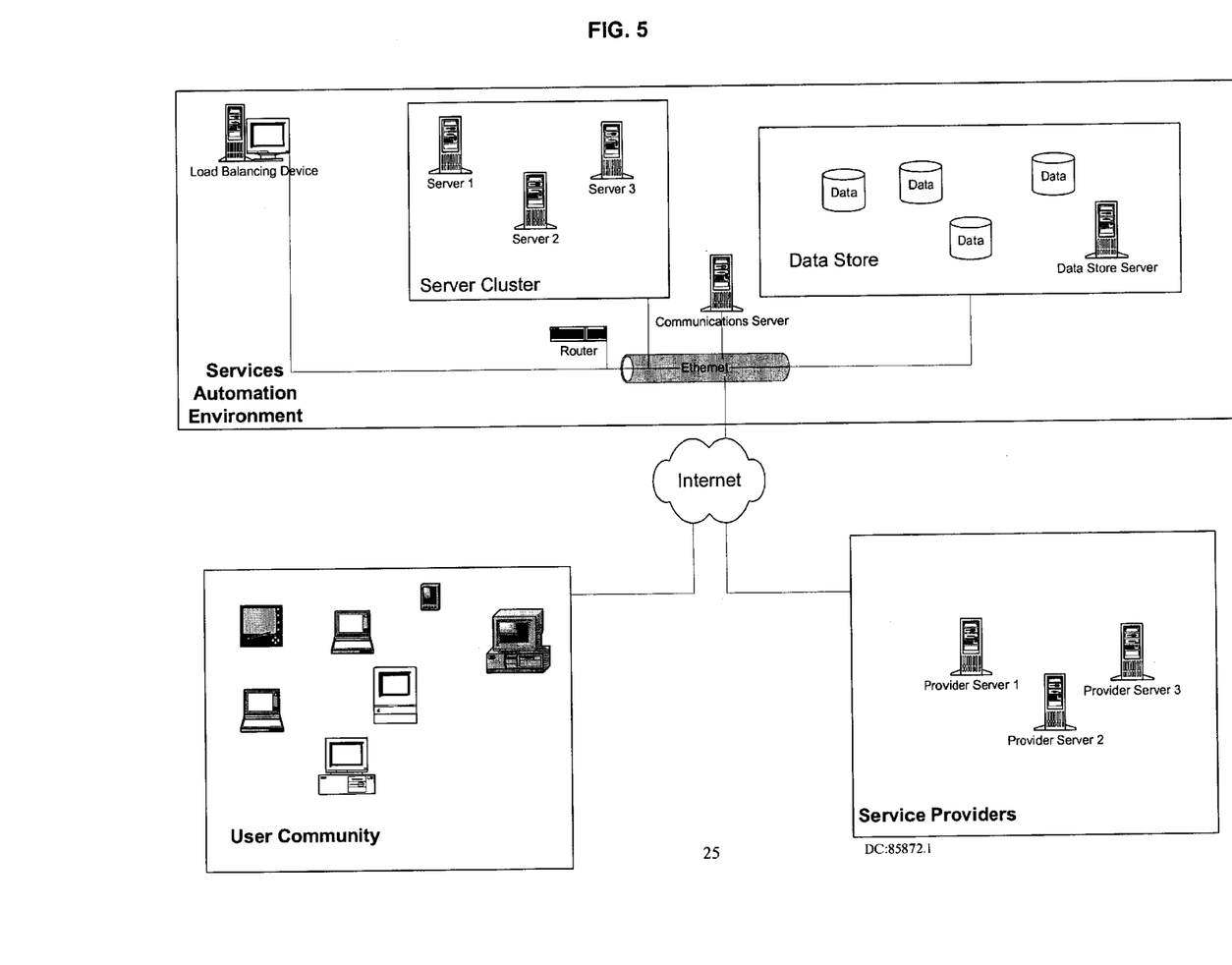
FIG. 5 is an architecture diagram for a typical back end environment.
Figure 6:
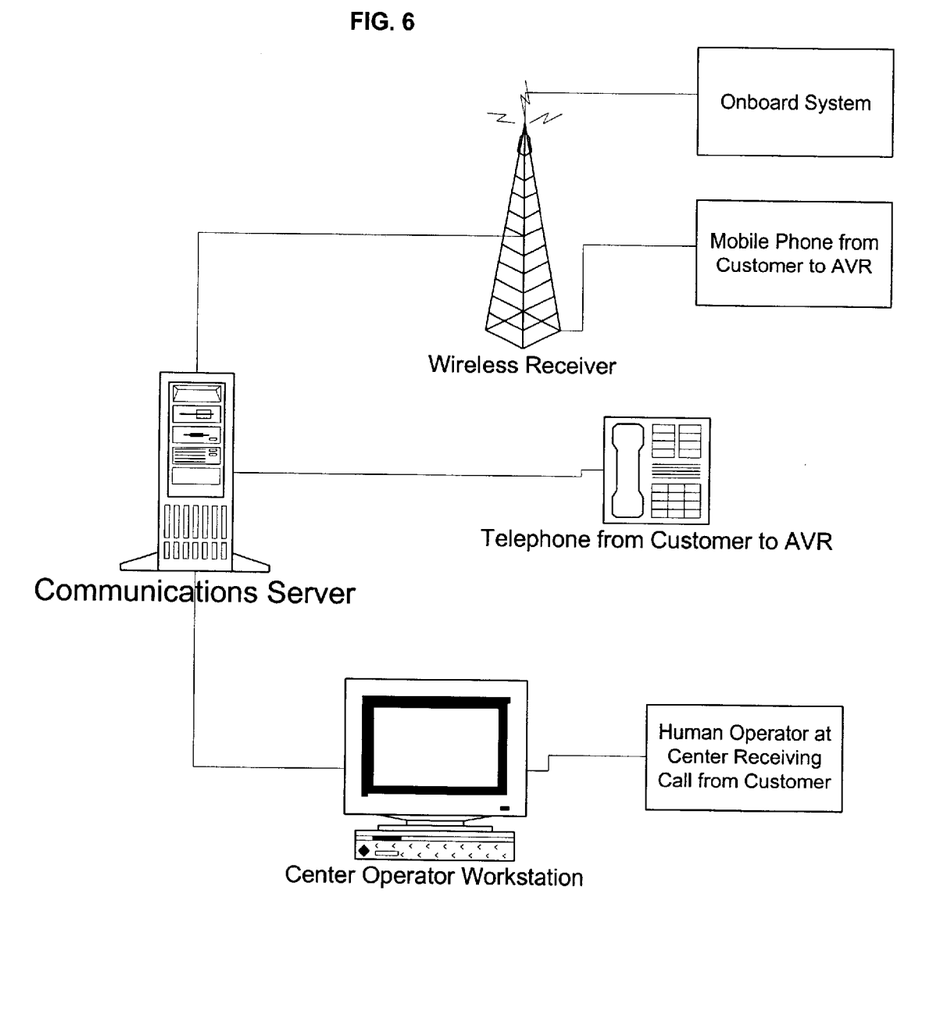
FIG. 6 is a block diagram graphically depicting typical non-Web-based communication with the back end environment.

FIG. 6 is a graphical depiction of several communications mechanisms to the back end customer service automation environment. Communication to the back end environment may occur via one or more communication servers. The communication servers may host the AVR software supporting the automated interactions with the customer through the customers mobile or landline telephone connection. Additional communication may occur through direct communication with onboard sensors as previously described. Further, the communication may occur through a voice communication channel to an operator at an operational control center that enters the distress event information into a suitable configured workstation. Alternatively, in some embodiments, access to the environment may be through a computer network such as the Internet as seen in FIG. 5.

FIG. 5 depicts a typical back end customer service automation environment. Input information may be filtered through one or more communication servers that support interfacing with communications mechanisms. The communication server(s) will have a communications link to the remainder of the environment; in a typical embodiment, this link will be a computer network connection such as the Ethernet depicted. The Ethernet will include suitable router hardware and software for managing the traffic over the network. A load-balancing device will optionally be included in the environment to distribute workload among the various components of the environment. In addition to the mechanisms in FIG. 6, customer access to the back end environment may be supported via user community computers with a communications link to the environment such as via the Internet; further, third party notification of a distress event may typically be communicated either by telephone (landline or mobile) through a human operator or AVR or directly to the environment via a communications channel such as the Internet.

In some embodiments, a data store may be utilized to store data needed by the environment such as customer and vehicle related data that is utilized in the response plan generation and execution. In other embodiments, this data, if required, may be hosted by a variety of service providers such as insurance providers, vehicle dealerships or repair facilities, etc. Where a data store is utilized, any suitable organization may be used such as one or more database servers, local storage connected to other systems in the environment, network connected storage devices, etc. In one embodiment, a relational database is used to store the data managed by one or more database servers. Other database architectures such as object-oriented, object relational, hierarchical, spatial or other hybrid architecture could be used in other embodiments.

Service providers may also be connected to the environment via a suitable communications link such as the Internet. Such providers may include insurance providers, vehicle dealerships, repair facilities, towing services, rental agencies, emergency and law enforcement authorities, etc. One or more specific servers in the environment may be utilized to facilitate the interactions between the service providers and the environment; in one such embodiment, one or more business-to-business servers such as the B2B Servers by WebMethods could be used to support this functionality.

The environment may include one or more servers supporting Web functionality and interaction by members of the user community, service providers and workstations in an operations center utilizing the environment. Such Web servers could run any suitable server software such as the Internet Information Server by Microsoft or the iPlanet Web Server by iPlanet. In connection with the Web server, one or more application servers may be used to support the business and application logic necessary to provide the customer automation services according to the present invention. Such application servers could run any suitable application server software such as WebSphere from IBM or iPlanet's Application server. The business logic could be implemented through a variety of technologies and technology architectures including Java servelets, COM/DCOM objects, CORBA, and/or Enterprise Java Beans. The application servers may be responsible for encapsulating the functionality to generate and execute the response plans as described in more detail below. Communications would be handed off to appropriate other servers (e.g. Web servers and communications servers).

In embodiments utilizing a data store within the environment, access may occur through specific interfaces in the application server such as through JDBC protocol. Additional servers such as the ColdFusion server by Allaire in connection with the Web server(s) may also provide access to the data store.

Where the vehicle is provided by a rental agency, the rental agency may interact with and utilize the environment according to the present invention. The rental agency may support the enhanced customer service in all or selected vehicles that it provides to consumers. In one such embodiment, the renter may be asked at the point of contracting with the agency to provide identifying information to the agency. This information may be used within the scope of the present invention to determine insurance coverage that the renter may have with respect to rental vehicles. Depending upon the this determination, the rental agency may offer insurance where the renter does not have existing coverage or companion coverage above any existing coverage the renter may have. If accepted, this coverage, or lack of coverage, information may be used in the providing the automated customer services of the present invention with respect to rental vehicles. In a further embodiment, where the renter's current coverage with her carrier does not provide rental vehicle coverage, such coverage may be offered by her carrier for purchase at the point of contracting for the rental. This offer may be in addition to, or in lieu of, coverage offered by the rental agency. In one embodiment, the identifying information is not received at the point of contracting with the agency, but this information may be provided by the renter via an operator-activated device 240, or other appropriate communication mechanism with either the rental agency or the system according to the present invention, at some point during the rental period. At such time, similar checks and offers of coverage may be provided. These offers may be impacted by any monitored distress events, or lack thereof, during the time period since the renter took possession of the vehicle. As with coverage obtained at the point of contracting, subsequent acquisition of coverage would then be used in in the providing the automated customer services of the present invention with respect to rental vehicles.

In a further embodiment involving rental vehicles, the monitoring of distress events according to the present invention may be used to generate pricing over the course of the rental term. Rental agency typically charge renters on a daily, weekly or monthly basis. One of the factors in pricing such rentals is the depreciation in value of the vehicle based upon usage. The distress events, or lack thereof, as monitored by the present invention may be utilized to generate surcharges or credits based upon actual use of the vehicle to more accurately price the rental. Such distress events may include, without limitation, speeding, excessive mileage traveled, unreported (potentially minor) collisions or bumps, ABS deployment, numbers of instances of hard breaking and/or rapid acceleration. The calculated surcharges or credits may be applied either as the rental fees accrue on a per day, per week or per month basis or in one lump credit or surcharge at the end of the rental period.

Similarly, a vehicle-leasing agency could use the tracking of distress events to generate pricing for specific periods of the lease. In a typical leasing arrangement, the lease costs are paid in periodic payments over the term of the lease with potential lump sum payments on the front or back end. The costs of the lease term utilize a generalized estimate of the depreciation of the vehicle based upon usage. The monitoring of distress events, or lack thereof, may be utilized by a leasing agency to provide credits or surcharges to the lessee based upon actual usage rather than estimated usage. Such distress events may include, without limitation, speeding, excessive mileage traveled, improper or proper compliance with suggested regular maintenance, unreported (potentially minor) collisions or bumps, ABS deployment, numbers of instances of hard breaking and/or rapid acceleration. The monitoring of distress events as specified herein would serve as the basis for the calculation of the credits or surcharges. The calculated credits and surcharges could be applied either to the periodic payments based upon the monitoring over the period covered by the periodic payment or could be accumulated and assessed at the end of the lease term as either an end term surcharge, added to any lump sum end of term payment that might apply, or an end term refund, applied to any lump sum end of term payment that might apply.

The generated response plan will depend upon the distress event detected. Distress events may fall into several broad categories including, but not limited too, a vehicular accident; a vehicle loss due to water or fire; a mechanical failure, or potential failure; health danger, or emergency; or a theft, theft in progress or carjacking. The response plan generated will depend upon both the generic distress event detected as well as the factual circumstance of the particular distress event.

In some embodiments, the generated plan may also involve automated review of information associated with the customer and/or the vehicle. For instance, vehicle information such as warranty coverage, comprehensive and collision insurance coverage, towing and labor coverage, rental reimbursement coverage, roadside assistance coverage, mechanical breakdown coverage, service contract coverage maintenance history, parts lists, suggested maintenance schedules, etc may impact response plan generation. In addition, customer information such as timing and method of notification delivery and priority settings, personal contact information, individuals requiring contact, preferences of repair facilities, rental car type, previous service representative, etc. may further impact response plan generation.

Once a response plan is generated, or a partial plan in those embodiment utilizing iterative generation and execution, the plan, or portion thereof, is executed in at least a semi-automated fashion. In some embodiments, the response plan may be executed in a fully automated fashion. The automated actions may be carried out through a variety of computer systems that may be connected via a suitable communications channel such as a direct connection, a dial-up connection, a direct subscriber line, a computer network or other suitable link. In one embodiment, a computer network such as an intranet, the Internet, an Ethernet or some combination thereof connects the various systems.

Figure 4:
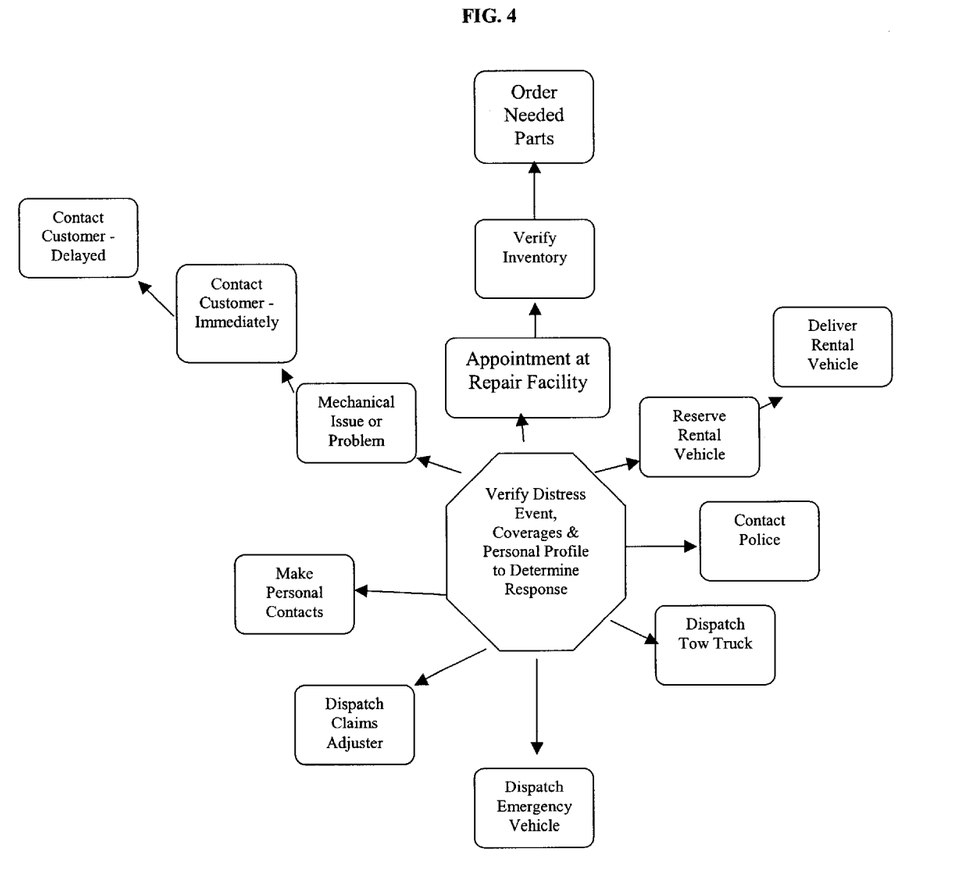
FIG. 4 is a block diagram depicting various actions that may be generated in the response plan and executed.

FIG. 4 provides a block diagram of various actions that may be included in a generated response plan and executed according to the present invention. The arrows are indicative of a progression of actions in one embodiment; other progressions and actions may be utilized in other embodiments within the scope of the present invention.

The foregoing discussion provides exemplary embodiments with respect to a variety of distress events including accident and/or loss due to water or fire, actual or potential mechanical failure and theft or carjacking situations. The examples discuss potential modes of detection along with typical actions which may be part of the generated response plan and which may be executed in an automated or semi-automated fashion.

An Accident or Loss due to Flood or Fire

EXAMPLE

Sensors detect that a vehicle has been involved in a collision. The sensors indicate that the front end of the vehicle and right front quarter panel have been damaged. Customers service responses could include locating the accident site via GPS, dispatching law enforcement, vehicle towing service, locating a rental vehicle that matches the preference included in the customer's profile, and having the rental delivered to the site. An appointment is made at a local repair shop (again after checking the customer's preference in their profile) and any out of stock inventory is ordered.

Same scenario except the vehicle is a total loss. Instead of making an appointment at the local repair shop a similar vehicle is located (in accordance with the customer profile) and financed and delivered to the customer.

Notification Triggers:
- vehicle sensor (typical sensors that could be used to generate this type of trigger are described above);
- customer initiated (typically, the customer could generate this trigger via a panic button either mounted in the vehicle or through another suitably configure wireless device (e.g. panic button with wireless transmitter to car activating transmission of trigger via vehicles wireless communication facilities, mobile telephone with suitable preprogramming or specialize hardware, etc.) or via a mobile or landline telephone to either a human operator or an AVR); and/or
- $3^{rd}$ party initiated (typically, this may result from a listing of a vehicle as abandoned by appropriate public authorities, a police report involving the vehicle, etc.).

Actions Could Include:
Through GPS determine location of the accident or loss.
Search records to identify types of insurance and/or warranty coverage provided—physical damage, rental car, mechanical breakdown and roadside assistance.
Notify the 24/365 claims call center.
Notify police, emergency vehicles and tow trucks to the scene depending upon type and severity of accident or loss as determined from the one or more notification triggers.
Depending on coverage, make a "priority" appointment at a dealership or repair shop. The present invention may support selection criteria for picking the particular dealership and shop. The criteria may include affiliation and/or other relationship with customer service automation provider, geographic proximity, internal or external rating of shop based upon price, quality, etc., guarantees and/or warranties provided, etc.
Make reservations for a rental car that is comparable to the type involved in the loss or referenced in the customer profile. The rental car and agency providing the rental car may be selected based upon a variety of criteria including, but not limited to, affiliation and/or other relationship with customer service automation provider, geographic proximity, internal or external rating of the agency based upon price, quality, etc.
Deliver the rental car to the customer.
If a total loss then locate equivalent vehicle from dealer's lots or from return leased vehicles or other listings of available vehicles. The present invention may support selection criteria for picking the particular dealership. The criteria may include affiliation and/or other relationship with customer service automation provider, geographic proximity, internal or external rating of dealership based upon price, quality, etc., guarantees and/or warranties provided, etc. Arrangements could also be made with respect to the financing of the replacement vehicle.
According to the customer profile contact relatives, employer etc.
Dispatch an adjuster to the scene.
Make an appointment to inspect the vehicle and talk to the customer about the accident.
Based on vehicle sensors impacted determined what parts are damaged and check the local dealership if the parts are in inventory and if they are not order them.

Mechanical Failure or Potential Mechanical Problem

EXAMPLES

A sensor detects that there is a problem with tread separation on a vehicle's tire.

Actions could include: calling the customer immediately, notifying them of the problem and the closest repair facility, dropping off a Chevy Tahoe if they are driving a Grand Cherokee and ordering replacement tires if they are not in the dealership's inventory.

If it were of lesser concern like a headlight being out or a defective turn signal then the same process would be followed. However it would not necessarily be immediate. Written notification or electronic notification of the problem may be provided. The delivery platform may be indicated in a customer profile.

Notification Triggers:
- vehicle sensor (typical sensors that could be used to generate this type of trigger are described above);
- customer initiated (typically, the customer could generate this trigger via a panic button either mounted in the vehicle or through another suitably configure wireless device (e.g. panic button with wireless transmitter to car activating transmission of trigger via vehicles wireless communication facilities, mobile telephone with suitable preprogramming or specialize hardware, etc.) or via a mobile or landline telephone to either a human operator or an AVR); and/or
- $3^{rd}$ party initiated (this may result from a report by an affiliate service/repair shop that the vehicle is due for maintenance (e.g. oil change (after 3000 mile by sensor or after 3 months as determined by date of last oil change), tire rotation, etc.))

Actions Could Include:
Through GPS determine location of the vehicle
Search records to identify types of insurance and/or warranty coverage provided Rental car coverage, mechanical breakdown and roadside assistance
Notify the 24/365 claims call center.
Immediate phone call to the customer notifying them of the issue. This action may depend upon the type of failure, the severity and the customer's profile.
Immediate communication to the vehicles communication system (internal WEB system).
Provide the customer with options based on the type of problem and customer profile:
  a) Make an appointment at a dealership or repair shop. See above discussion of accident distress event with respect to potential criteria for selection of dealership or repair shop.
  b) Make reservations for a rental car that is similar to the type as the one needing repair or referenced in the customer profile. See above discussion of accident distress event with respect to potential criteria for selection of rental car and agency.
  c) Deliver the rental car to the customer if the problem is safety related.
  d) Dispatch a tow truck to take the vehicle to the dealership or repair shop.
Based on sensor indicating failure or potential failure, check the dealership or repair shop for the part in inventory and order it if necessary.

Notify the customer, and/or other individuals as indicated in a customer profile, at a non-driving time if the event is not serious or safety related.
Thefts and Carjacking

EXAMPLE

A sensor detects that the steering wheel is being compromised, or the airbag is being removed without having deployed or that multiple assemblies have been removed indicating that the car is being disassembled. Locate the vehicle, dispatch the police and the adjuster, notify Special Investigative Unit and the customer. Deliver a comparable rental vehicle and dispatch an adjuster. Search available inventory for comparable vehicles and offer them to the customer upon settlement to settle the claim.

Notification Triggers:
- vehicle sensor (typical sensors that could be used to generate this type of trigger are described above);
- customer initiated (typically, the customer could generate this trigger via a panic button either mounted in the vehicle or through another suitably configure wireless device (e.g. panic button with wireless transmitter to car activating transmission of trigger via vehicles wireless communication facilities, mobile telephone with suitable preprogramming or specialize hardware, etc.) or via a mobile or landline telephone to either a human operator or an AVR); and/or
- $3^{rd}$ party initiated (reports of theft to police or abandonment of vehicles)

Actions Could Include:
- Through GPS determine location of the vehicle
- Search records to identify types of warranty and/or insurance coverage provided—physical damage, rental car, mechanical breakdown and roadside assistance
- Notify police and Special Investigative Unit
- Notify customer and/or individuals designated in the customer's profile
- Make reservations for a rental car that is similar to the type in the theft or referenced in the customer profile. See above discussion of accident distress event with respect to potential criteria for selection of rental car and agency.
- Deliver the rental car to the customer.
- If a total loss then locate equivalent vehicle from dealer's lots or from return leased vehicles. See above discussion of accident distress event with respect to potential criteria for selection of dealership.
- Dispatch an adjuster.

In all cases above, the designated actions may be impacted based upon results of earlier occurring actions. For instance, retrieval of customer profile and insurance/warranty information may significantly impact whether a subsequent action occurs or the parameters to be used in such subsequent actions.

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated that many deviations may be made from the specific embodiments disclosed in this specification without departing from the invention.

What is claimed is:

1. A method for automating and enhancing customer service in vehicle distress situations comprising:
   detecting a vehicle distress event;
   wherein an on-board sensor is in electrical communication with an on-board computer and an on-board recording system;
   wherein the on-board computer and the on-board recording system are capable of electrical communication with a communications link and a navigation subsystem;
   generating a response plan;
   wherein the response plan is a function of predetermined customer provided information and the distress event; and
   executing at least one of the generated response plans.

2. The method for automating and enhancing customer service in vehicle distress situations of claim 1, wherein the predetermined customer provided information includes at least one of timing and method of notification delivery and priority settings, personal contact information, individuals requiring contact, preferences of repair facilities, desired rental car type, and previous service representative.

3. The method for automating and enhancing customer service in vehicle distress situations of claim 1, further comprising a response plan that is iteratively generated and executed.

4. The method for automating and enhancing customer service in vehicle distress situations of claim 1, wherein the response plan is automatically generated by a computer system.

5. The method for automating and enhancing customer service in vehicle distress situations of claim 1, further comprising detecting the distress event as a result of a computer system being in communication with a user community and service providers.

6. The method for automating and enhancing customer service in vehicle distress situations of claim 1, wherein the detecting of the distress event is a result of sensors in electrical communication with an onboard computer system.

7. The method for automating and enhancing customer service in vehicle distress situations of claim 6, the sensors include at least one of a seat belt sensor, altimeter sensor, water level sensor, electrical system sensor, air bag sensor, bumper sensor, panel impact sensor, parts removed from vehicle sensor, impact sensor, anti-theft sensor, glass sensor, ignition switch sensor, lock sensor, driver voice identification sensor, location (GPS) sensor, tire pressure sensor, communications links sensor, speed sensor, maintenance sensor, barometric pressure sensor, environmental conditions sensor, temperature sensor, fuel sensor, distance traveled sensor, accelerometers sensor, and an antilock brake system sensor.

8. A method for automating and enhancing customer service in vehicle distress situations comprising:
   detecting a vehicle distress event;
   generating a response plan in response to the distress event;
   wherein the response plan is based on customer provided information and the distress event;
   executing at least one of the generated response plan; and
   detecting the distress event as a result of an action by a third-party.

9. The method for automating and enhancing customer service in vehicle distress situations of claim 8, wherein the third-party is at least one of law enforcement personnel, emergency service personnel, and a reporting agency.

10. The method for automating and enhancing customer service in vehicle distress situations of claim 9, wherein the reporting agency monitors communication to determine presence of a distress event.

* * * * *